Figure 2:
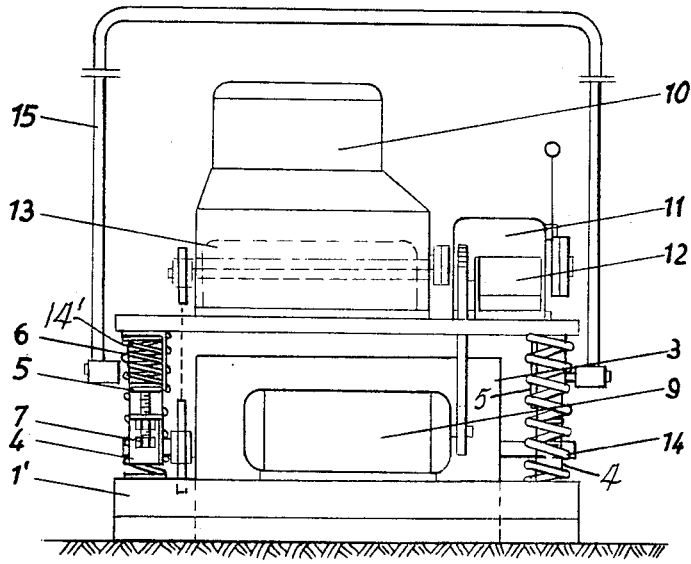

INVENTOR.
PHILIPP UEBEL

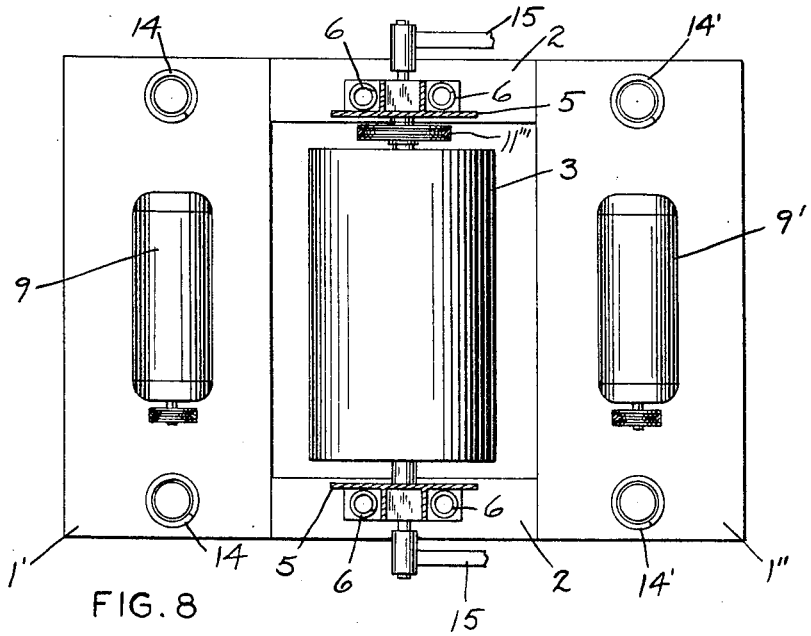
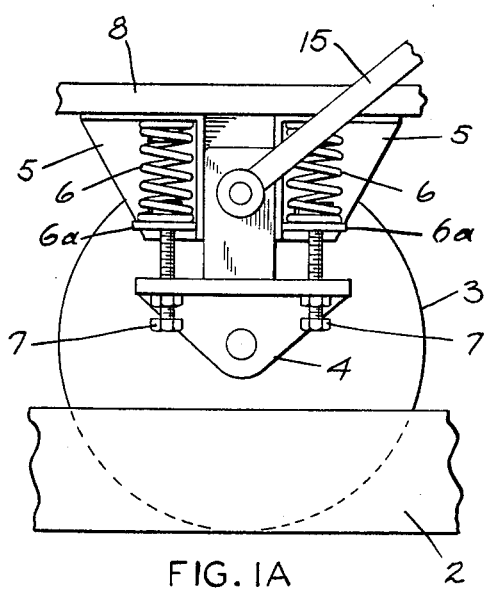
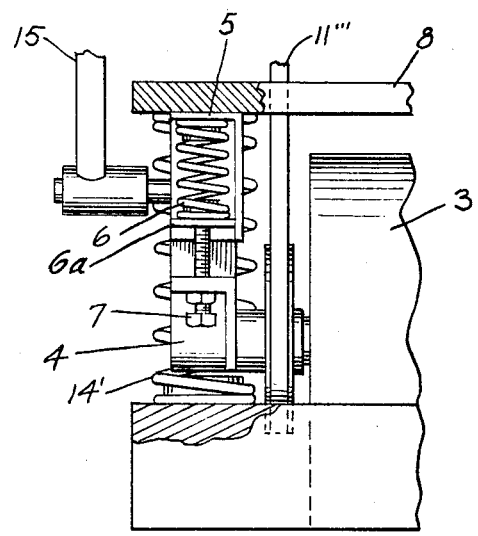

Nov. 8, 1966  P. UEBEL  3,283,677
MANUALLY GUIDED MOTOR DRIVEN TAMPING DEVICE
FOR EARTH, CONCRETE AND OTHER MATERIALS
Filed Sept. 1, 1964  5 Sheets-Sheet 5

INVENTOR.
PHILIPP UEBEL
BY
Robert H. Jacob
AGT.

United States Patent Office 3,283,677
Patented Nov. 8, 1966

3,283,677
MANUALLY GUIDED MOTOR DRIVEN TAMPING DEVICE FOR EARTH, CONCRETE AND OTHER MATERIALS
Philipp Uebel, Munich, Germany, assignor to Hermann Wacker and Peter Wacker, Munich, Germany
Filed Sept. 1, 1964, Ser. No. 393,605
8 Claims. (Cl. 94—48)

The invention relates to tamping equipment and is particularly concerned with a combination of a vibrating plate and a roller in such a manner that the vibrating plate has a recess in which the roller is arranged. The driving of the roller and of the eccentrics for the plate is effected by a motor by way of a reversing gear and a transmission by means of chains, V-belts and the like. The power supply components are mounted upon an upper plate and are supported by way of springs upon the vibrating plate or over a bearing block on the roller.

Vibrating plates and rollers per se are sufficiently known. The combination of vibrating plate and roller is known in such an embodiment where with an ordinary tandem roller, one roller is replaced by a vibrating plate. Such an arrangement, however, has considerable shortcomings. The construction is very expensive because a heavy vehicle frame and complicated driving elements are necessary. On the other hand, a correspondingly large part of the weight of the vehicle rests upon the vibrating plate, so that it is difficult to effect the synchronizing or tuning between the eccentric of the vibrating plate, the weight of the plate, resiliently balanced, with respect to the top load and the weight of the load per se. Furthermore, the combination of a tandem roller-vibrating plate provides merely small steering facility owing to its relatively large manner of construction.

It is an object of the invention to combine the advantages of the roller, such as rapid and exact forward and reverse running, good climbing ability and considerable surface performance to a significant extent with the advantages of the vibrating plates, such as packing performance and small manner of construction.

This problem is solved in accordance with the invention in that a recess is provided in a vibrating plate in which a roller is arranged. The roller and the eccentrics are driven by a motor by way of a reverse gear and a transmission by means of V-belts, chains and the like. These driving elements are mounted upon an upper plate and are supported by resilient elements such as springs, rubber pads and the like upon the vibrating plate or by way of resilient elements and support blocks upon the roller.

The support or bearing blocks for the roller with the associated resilient elements are constructed in a manner that they make it possible to accurately adjust for the proportion of the weight of the upper plate that is to be carried by the roller. In this manner it is accomplished that the bearing load on the spring elements which connect the upper plate with the vibrating plates can be readily changed. The vibrating system comprising plate, springs and bearing load, may thus be synchronized at any time with respect to the medium to be compressed.

The essential advantage of this combination resides in the fact that all eccentrics of the vibrating plate can be set in a manner that the components of he eccentric forces need to be effective only in a vertical direction upwardly or downwardly. The advancing component which involves a loss in compressing performance is thus eliminated. The construction in accordance with the invention also permits of obtaining a maximum in compression performance.

A further advantage of this arrangement resides in that a part of the eccentric vibrations which are initiated by the vibrating plates by way of the springs into the upper plate and transferred thence again upon the roller so that the roller acts as a vibrating roller.

A further essential advantage of this combination of vibrating plate and roller resides in the great advancing velocity which it attains even upon damp or wet materials upon which otherwise a vibrating plate alone would frequently not obtain forward movement. In such cases the vibrating plates are only scarcely in the position to overcome the adhesion between ground and plate. To this is added the feature of considerable climbing ability of such a combination which is not attained by the vibrating plates alone. It follows from this that the arrangement which constitutes the basis of the invention provides also a considerable surface capacity besides considerable compression capacity.

A further advantage of the arrangement in accordance with the invention is the compact manner of construction which imparts to the apparatus outstanding flexibility so that it can be utilized to advantage even upon the smallest and most angular surfaces.

A further inventive feature of the apparatus is that the front and rear portion of the vibrating plate as well as the roller can be constructed in a manner that they may be steered or that only the roller is arranged to be steered and the vibrating plates are steered thereby so that the eccentrics of the plates are variably arranged with respect to their phase position.

Figure 1:
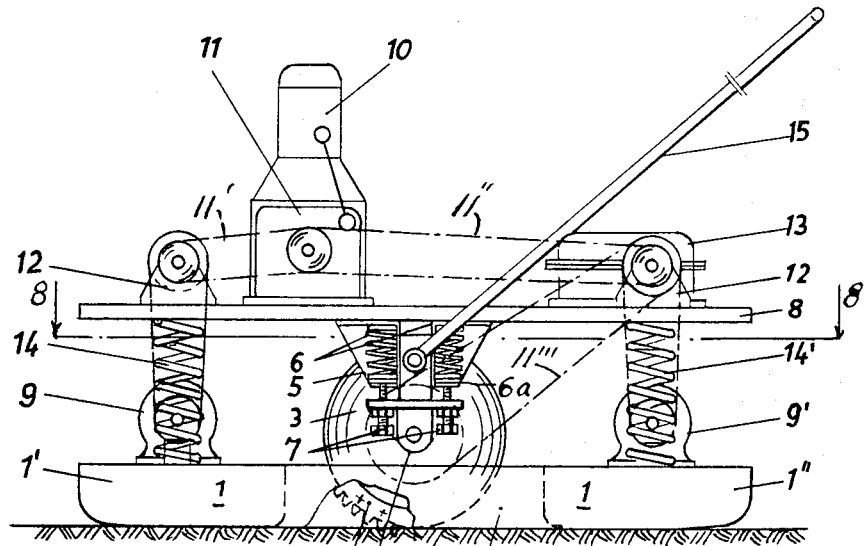
Figure 3:
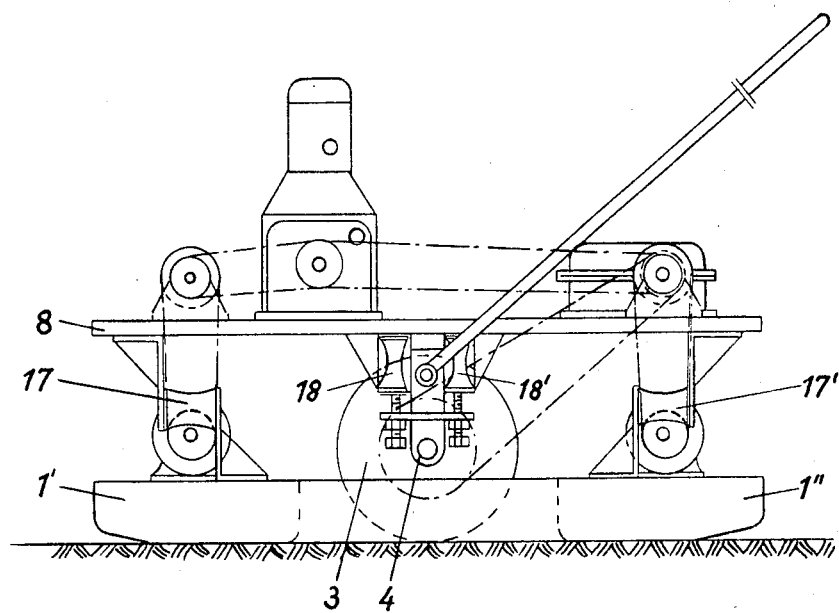
Figure 5:
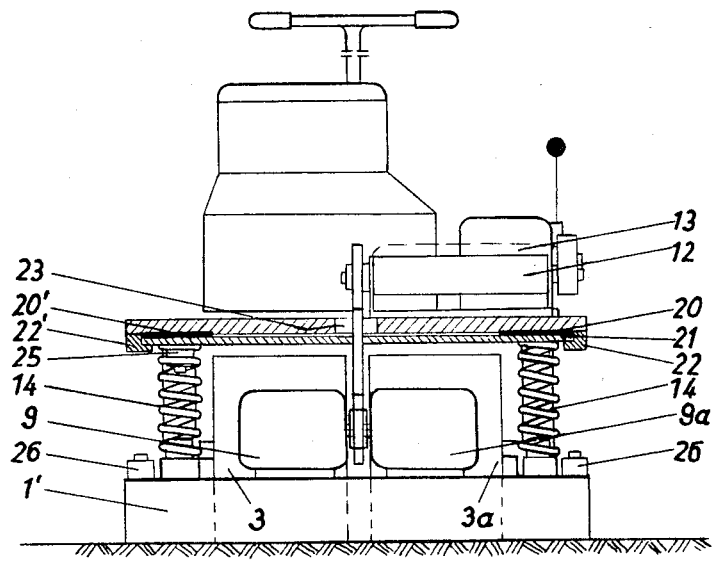
Figure 4:
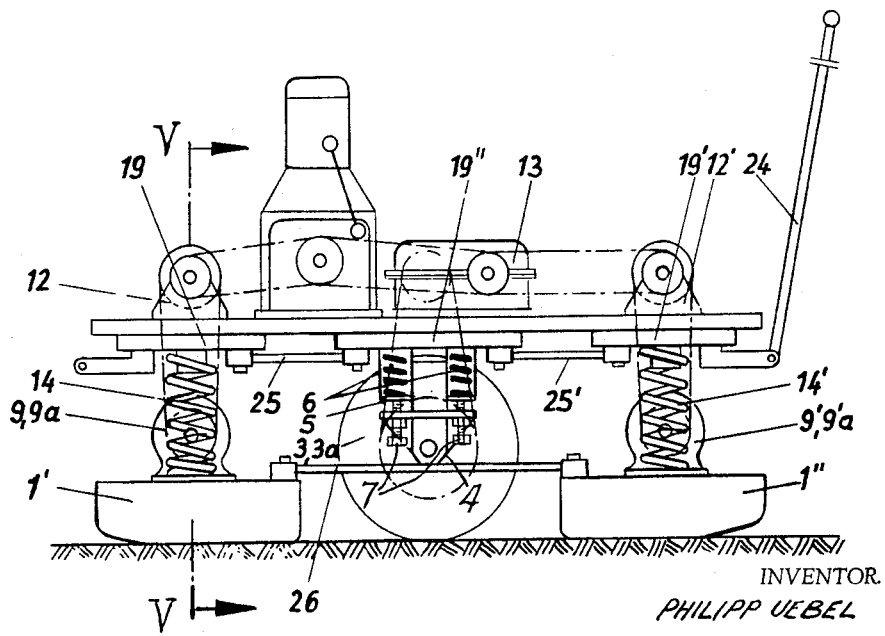
Figure 6:
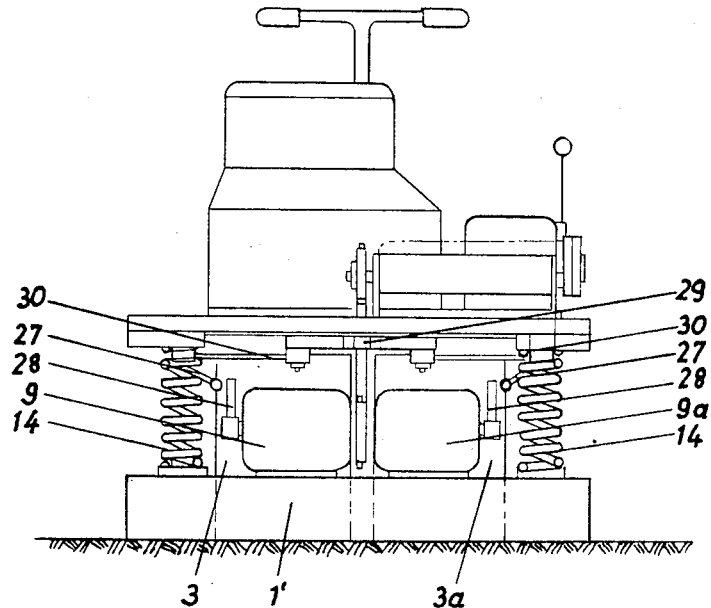
Figure 7:
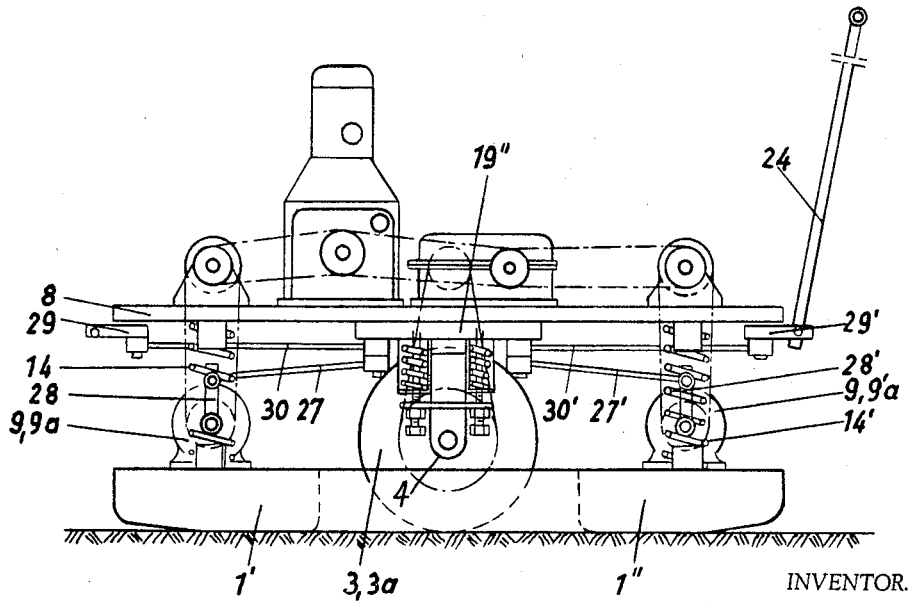

Further advantages and details of the invention will become apparent with reference to the accompanying drawings, in which:

FIG. 1 is a side view of the machine in accordance with the invention,

FIG. 1A illustrates the adjusting means in accordance with FIG. 1 to an enlarged scale, FIG. 2 is a front view of the machine in accordance with the invention, partly in section, FIG. 2A is a view showing the adjusting means in accordance with FIG. 2 to an enlarged scale, FIG. 3 illustrates an embodiment of the machine having rubber elements to provide resiliency, FIG. 4 is a side view of a machine having a steerable roller and steerable plates, FIG. 5 illustrates a machine in accordance with FIG. 4 taken along the section line V—V in FIG. 4, FIG. 6 shows a machine having a steerable roller with the vibrating plates rigidly secured and with eccentrics having variable phase positions, FIG. 7 shows a machine in accordance with FIG. 6 in front view, partly in section, and FIG. 8 is a plan view of the vibrating plate taken along line VIII—VIII in FIG. 1.

The vibrating plate 1 is provided with a rectangular cutout in the center thereof. This cutout subdivides the vibrating plate into a front plate section 1' and a rear plate section 1", each of which supports a vibrator 9, 9'. Both vibrating plates are rigidly connected with one another by way of lateral span members 2.

A roller 3 is arranged in this rectangular cutout or recess which is journalled in the bearing bosses 4. Bearing bosses 4 are constructed in a manner that they may slide vertically in guide means such as jaws 5. The bearing bosses 4 are supported against the upper plate by means of resilient members such as springs 6 seated on disks 6a and which may be tensioned by adjusting means such as set screws 7. The vibrators 9 and 9' are driven by a motor 10 that is mounted upon the upper plate 8, by way of power transmission means including a reversing gear 11 and toothed belt means 11', 11" and 11''' or the like, with bearing pulleys 12 and 12' being interposed. The roller 3 is likewise driven by a motor 10 and reversing gear 11 by way of the transmission 13 with toothed belts, V-belts, chains or the like.

It should be noted that in FIG. 2 the spring 14 on the left side of the machine between the upper and lower plates is omitted to expose the supporting means for the roller 3.

The upper plate 8 together with the components mounted thereon is supported on the one hand upon roller 3 and on the other hand by way of springs 14 upon the plate section 1' and by way of springs 14' upon the plate section 1". By virtue of the fact that the part of the weight of the upper plate 8 that is supported by the roller 3 can be varied by set screws 7 the top load for the vibrating plate sections 1' and 1" can be suitably adjusted to the swing system which includes the material to be concentrated, the centrifugal forces of the eccentrics of the vibrating plate sections 1' and 1", the springs 14 and 14' and the top load.

The apparatus is guided by means of a bail or handle 15 that is linked to the bearing boss 4 and is constructed in a manner that it can be pivotally moved at both ends of the machine.

In order to increase the sliding performance the roller 3 may be provided with a toothed rack 16 (indicated in FIG. 1).

A further embodiment of the invention is illustrated in FIG. 3 where the vibrating plate sections 1' and 1" are connected with the upper plate 8 by way of resilient rubber elements 17 and 17'. Likewise the bearing bosses 4 are supported against the upper plate 8 by way of rubber blocks 18, 18'.

A further structural improvement of the apparatus is illustrated in FIGS. 4 and 5 where the roller 3 as well as also each vibrating plate section 1' and 1" are arranged for rotation about their vertical axis by suitable means. The rotating devices 19, 19', 19" which may be of the same construction for the roller 3 and the plate sections 1' and 1" consist of sliding tracks 20 and 20' provided in an arcuate maner in the upper plate 8. A circular plate 21 slides on these sliding tracks 20, 20' to which springs 14 and 14' for the vibrating plate sections 1' and 1" are fastened. For the rotating device 19" of the roller 3 corresponding springs 6 are provided and for the bearing bosses 4, guide jaws 5. The angular members 22 and 22' which are of circular shape protect the plate 21 against vertical and horizontal displacement.

Centrally of the plate 21, i.e., in the vertical axis of rotation, a recess 23 is provided through which the drive between the toothed belt, V-belt, or also universal shafts or the like for the eccentrics 9 or 9', is effected. The eccentrics 9 and 9' as well as also the roller 3 for the arrangement in accordance with FIGS. 4 and 5 are advantageously constructed in two parts 9, 9a, 9', 9'a and 3, 3a. The steering movement is initiated for the rotating means 19, 19' and 19" of the roller 3 and the vibrating plate sections 1', 1", for example, by the draw bar 24 which may be interchangeably linked to the rotating means 19 or 19' either of the forward vibrating plate or the rear vibrating plate, or with a hand wheel by way of reversing or transmission gearing. Hydraulic driving of the rotating means is also possible (the latter arrangements are not illustrated in the drawings). Transmission of the rotary movement to the rotating devices 19", 19 or 19", 19' of the roller 3 and of the vibrating plate sections 1' or 1" is effected by suitable means, as, for example, steering bars 25 and 25'.

In the steerable embodiment of the invention the rigid connection 2 between vibrating plate 1' and 1" is replaced by two steering bars 26.

A further embodiment of the invention is illustrated in FIGS. 6 and 7. In this arrangement only the roller 3 is adapted to be steered, while the vibrating plate sections 1' and 1" are again rigidly connected by way of springs 14 and 14' with the upper plate 8. The eccentrics 9 and 9' are each in two parts 9 and 9a or 9' and 9'a. In order to accomplish easier steering of the apparatus the phase position of these pairs of eccentrics 9 and 9a or 9' and 9'a may be changed which results in a centrifugal force component that acts in the sense of the desired change in direction of the apparatus.

The steering of the eccentrics 9, 9a and 9', 9'a is synchronized with the steering of the roller 3, for example, by means of link bars 27 and 27' connected with the roller which change the phase position of the eccentrics by way of levers 28 and 28'. The steering of the roller 3 is effected by means of the handle 24 by way of lever 29 or 29' and link bar 30 or 30'.

Having now described my invention with reference to the embodiments illustrated I do not wish to be limited thereto but what I desire to protect by Letters Patent of the United States is set forth in the appended claims.

I claim:

1. Manually guided and self-propelled motor driven tamping device comprising, in combination as a unit, vibrating plate means, an upper plate, power drive means and a roller; said vibrating plate means having two vibrating plate members securely connected with each other to define a centrally disposed open area, said roller being disposed in said open area; eccentric means, one mounted on each of said two plate members; said upper plate being mounted above said vibrating plate members; bearing block means mounted below said upper plate and supporting said roller; guiding means for said bearing block means mounted below said upper plate; first resilient elements disposed intermediate said bearing block means and said upper plate and biasing said roller against said upper plate; said power drive means comprising a motor mounted on said upper plate, power transmission means operatively connecting said motor to said eccentric means and to said roller; and second resilient means extending intermediate opposite ends of said upper plate and each of said two vibrating plate members proximate said eccentrics, where said upper plate constitutes the load on said second resilient means and on said vibrating plate members.

2. Manually guided motor driven tamping device in accordance with claim 1, including adjusting means disposed on said bearing block means and adapted to adjust the tension of said first resilient elements intermediate said roller and said upper plate to vary the load carried by said roller.

3. Manually guided motor driven tamping device in accordance with claim 2, where said eccentrics and said roller are subdivided into two parts substantially centrally of said device and said power transmission means are linked thereto symmetrically substantially at the centers thereof.

4. Manually guided motor driven tamping device in accordance with claim 1, where said first and second resilient elements are in the form of rubber pads, blocks or the like.

5. Manually guided motor driven tamping device in accordance with claim 1, including a bail mounted transversely of the device with its opposite ends proximate the ends of said roller for pivotal movement relative to said roller.

6. Manually guided motor driven tamping device in accordance with claim 1, where horizontally rotatable devices are mounted intermediate said upper plate and said vibratng plate members and intermediate said upper plate and said bearing block means, and linkage members are provided connecting said rotatable devices, and steering bars are interposed between said plate members, one proximate each end of said roller.

7. Manually guided motor driven tamping device in accordance with claim 6, including a steering handle and connecting means at opposite sides of said device proximate the ends of said roller for alternately connecting said steering handle thereto.

8. Manually guided motor driven tamping device in accordance with claim 1, where said power transmission means include belt means and pulley means, said pulley means being provided on said motor, said roller, said eccentrics and on the upper plate above said eccentrics.

References Cited by the Examiner

UNITED STATES PATENTS

| 2,223,024 | 11/1940 | Beierlein | 94—48 |
| 3,001,458 | 9/1961 | Croucher | 94—48 |

FOREIGN PATENTS

| 1,141,141 | 3/1957 | France. |
| 1,119,179 | 12/1961 | Germany. |
| 1,868,994 | 1/1963 | Germany. |
| 801,216 | 9/1958 | Great Britain. |
| 815,141 | 7/1959 | Great Britain. |

JACOB L. NACKENOFF, *Primary Examiner.*